United States Patent [19]
Matthews, III et al.

[11] Patent Number: 5,914,746
[45] Date of Patent: Jun. 22, 1999

[54] VIRTUAL CHANNELS IN SUBSCRIBER INTERFACE UNITS

[75] Inventors: Joseph H. Matthews, III, Redmond; Richard A. Gillmann, Issaquah; Keith L. Rowe, Seattle, all of Wash.

[73] Assignee: Microsoft Corporation, Redmond, Wash.

[21] Appl. No.: 08/435,989

[22] Filed: May 5, 1995

[51] Int. Cl.⁶ .................................................... H04N 5/44
[52] U.S. Cl. ............................... 348/10; 348/12; 348/731
[58] Field of Search .............................. 370/73, 436, 437, 370/486, 487; 348/6, 12, 13, 10, 11, 731; 455/185.1, 186.1, 186.2; H04N 5/44, 5/445, 5/50

[56] References Cited

U.S. PATENT DOCUMENTS

| | | | |
|---|---|---|---|
| 4,527,194 | 7/1985 | Siraza | 348/731 |
| 5,359,601 | 10/1994 | Wasilewski et al. | 370/73 |
| 5,425,101 | 6/1995 | Woo et al. | |
| 5,469,431 | 11/1995 | Wender | 370/478 |
| 5,534,941 | 7/1996 | Sie et al. | 348/6 |
| 5,550,578 | 8/1996 | Hoarty et al. | 370/73 |
| 5,585,866 | 12/1996 | Miller et al. | 348/731 |

FOREIGN PATENT DOCUMENTS

| | | | |
|---|---|---|---|
| 0453937 | 10/1991 | European Pat. Off. | H04N 5/50 |
| 0594350 | 4/1994 | European Pat. Off. | |

OTHER PUBLICATIONS

Beddow, David P., "The Virtual Channels Subscriber Interface", Communications Technology, Apr. 30, 1992.

Wasilewski, Anthony J. "An MPEG–2 Multi–Program Multiplex Syntax", International Organization For Standardization, Coding Of Moving Pictures and Associated Audio, ISO/IEC JTC1/SC29/WG11, MPEG 93/173, Jan. 1993.

Hedger et al. "Telesoftware–Valve Added Teletext"IEEE Tranaction on Consumer Electronics vol. CE–26 Aug. 1980 pp. 555–566.

Brugliera, Vito "Digital On–Screen Display –A New Technology for the Consumer Interface" 18th International Television Symposium, Montreux Switzerland 10–15 Jun. 1993.

*Primary Examiner*—David E. Harvey
*Attorney, Agent, or Firm*—Lee & Hayes, PLLC

[57] ABSTRACT

A subscriber interface unit for use in conjunction with a television and a remote cable network headend having a plurality of available programs. The available programs include broadcast television channels and executable applications. The executable applications are intended to be received and executed at the subscriber interface unit. The subscriber interface unit maintains a virtual channel table having entries for a plurality of virtual channel numbers. An entry for a particular virtual channel number includes a designation of an available program from the headend which is to be associated with the virtual channel number. The program can be a broadcast channel or an executable application such as an electronic programming guide. The subscriber interface unit has a channel selector which maintains a current virtual channel number and which is responsive to commands by a human viewer to change the current virtual channel number. When a virtual channel is selected, the subscriber interface unit requests associated program from the remote headend and presents it on the video display device. If the selected virtual channel is associated with an executable application, the subscriber interface unit downloads and executes the application.

18 Claims, 4 Drawing Sheets

VIRTUAL CHANNELS IN SUBSCRIBER INTERFACE UNITS

TECHNICAL FIELD

This invention relates to systems and methods for selecting from among the multitude of various types of programs available from an interactive entertainment cable distribution network.

BACKGROUND OF THE INVENTION

There are presently hundreds of channels available to TV viewers from cable, broadcast, satellite, and other systems. This number is steadily increasing. Furthermore, new uses are being developed for TV channels in addition to regular analog or broadcast television. Such new uses include digital video, interactive programming, networking of computer data and programs, hypermedia systems, etc. The current method of changing an analog television tuner from one frequency or channel to another and then watching the program on that channel does not work well in the new environment for several reasons. One reason is that some or many channels contain digital data, possible compressed, which looks like noise if viewed on an analog TV. Another reason is that some channels may contain only partial programming content and wouldn't be useful if selected directly. For instance, a channel might contain only a single, fixed camera view at a sporting event from a number of camera views available on different channels. Rather than looking at this fixed view, a viewer might like to be able to conveniently switch between views without memorizing different channel numbers, such as by simply manipulating a remote control unit's directional button.

As another example, some channels can be viewed in more than one way, as with channels having audio tracks or sub-channels recorded in more than one language. In these cases, simply selecting a channel is not specific enough—more information must be given regarding desired sub-channels.

Furthermore, future cable distribution systems will be providing services beyond traditional broadcast services. In many cases, cable subscribers will have available a private, bi-directional, digital communications channel with a cable headend. The subscribers will be able to use this private channel not only for receiving traditional television video and audio, but also for interactive tasks such as shopping, banking, and information retrieval. Another use of the channel will be for entertainment services such as movies-on-demand, where a viewer will be able to pick from a large library of movie titles and to request any of those movie titles for viewing at any time.

To make use of these extended cable services, it is contemplated that a somewhat sophisticated subscriber interface unit (often referred to as a set-top box or STB), connected in a viewer's home to a video display device such as a television, will provide an interface between the viewer and the cable headend (the most immediate source of programming). If a viewer wants to watch a broadcast TV channel, the STB will request a digital feed of the TV channel and will display the broadcast channel on the viewer's TV. Other services, however, will be available as applications which will be downloaded from the headend and executed on the STB itself. For instance, a shopping service might be available through a user interface or front-end which executes on the STB itself. Similarly, movies-on-demand might be selectable only through a user interface which runs on the STB. Rather than storing all possible applications at the STB, the applications will be stored at the headend and downloaded only as necessary.

The convenience of selecting between the great number of services available on such a system is an important factor in whether services will be accepted and used by typical viewers. However, the problem of navigating among the various services cannot be suitably dealt with by traditional computer interfaces. A command line interface is impractical because of the unavailability of a keyboard in most STBs. A graphical user interface could be adapted, but a TV's limited resolution would limit the number of symbols which could be simultaneously displayed, thereby mandating a very deep menu structure. Also, cursor control can be somewhat awkward with a button-type remote control device.

Service selections could be made via large numbers of buttons on remote controls. With the increasing numbers of available channels, however, this would soon become unworkable. Alternatively, a hierarchical structure of on-screen menus could be provided, wherein individual selections could be made with number keys. However, the menu structure would need to be very deep to accommodate large numbers of channels. Various other methods might be employed for service selection. However, no existing methods are completely satisfactory.

SUMMARY OF THE INVENTION

The invention described below allows a viewer to select from among all available services from a system headend by simply selecting the services as if they were traditional broadcast channels. In the embodiment of the invention described below, the STB maintains a virtual channel table which maps available services to virtual channel numbers. A viewer can designate a particular service, whether it is a broadcast television signal or an online shopping service, simply by designating a virtual channel number. The channel can be designated just like a channel on a traditional TV set—by pressing number keys or by pressing up/down buttons. Once a channel is selected, the STB requests the appropriate service from the head end. If the service is an application program, the STB downloads and executes the application program.

DETAILED DESCRIPTION OF AN EXEMPLARY EMBODIMENT OF THE INVENTION

Figure 1:
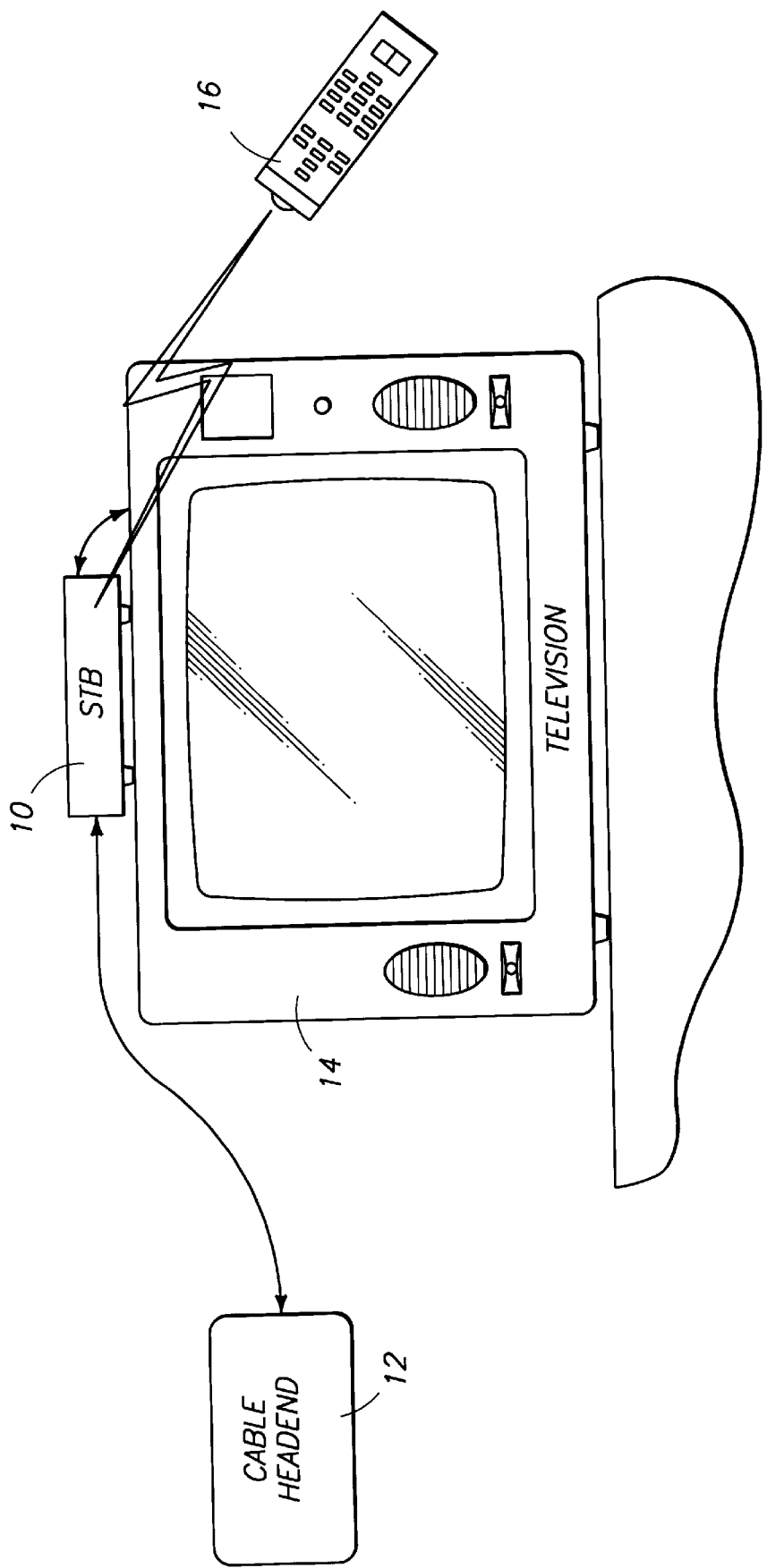
FIG. 1 is a diagrammatic representation of a subscriber interface unit, an associated television or video device and cable headend from which programming and services originate.

FIG. 1 shows pertinent components of an interactive entertainment cable distribution network comprising a plurality of subscriber interface units or STBs 10 connected to receive programs from a remote headend 12. STB 10 is used in conjunction with an audio/video display device or television receiver 14 and a hand-held remote control unit or infra-red keypad 16. One environment for the invention is in a hybrid fiber-optic/coax cable distribution system employing digital switching technologies such as asynchronous transfer mode (ATM) for bi-directional communications with individual subscribers. The headend in such a system is capable of supplying a number of different services or programs, ranging from traditional broadcast television, to movies-on-demand, to online shopping, banking, and information services. The invention could also be implemented in conjunction with other distribution media, such as in a satellite distribution system.

In an interactive distribution model being proposed by Microsoft Corporation, each STB is able to request any one of a plurality of services from the headend. The headend supplies these services on an individual basis to the individual STBs supported by the headend. Perhaps the most basic service consists of traditional broadcast television channels. Other services are more sophisticated. For instance, an electronic programming guide (EPG) is available as a service. The EPG is interactive in that it allows a user to scroll as desired to look up program listings for a specified time. Movies-on-demand is another more sophisticated application which allows a viewer to select from a large number of available movies and to view any one of those movies at any time.

Generally, any service other than broadcast television requires its own application program running on the STB. For instance, the EPG runs on the STB and queries the headend as necessary to obtain programming information. Movies-on-demand requires a menu interface which runs on the STB. In general, each service has an associated program or application which runs on the STB.

It is desired, however, to keep the STBs as simple as possible. In view of this, it is not practical for an STB to have non-volatile storage for each different application it might be called upon to run. Thus, executable applications are available from the headend as demanded. When a viewer selects a service requiring an application to be executed on the STB, the application is downloaded and executed.

Thus, cable headend 12, in the this embodiment of the invention, can be characterized as having a plurality of different available "programs." As used herein, the term "program" indicates any single available service or combination of services which might be used as a unit by a viewer. For example, a program might consist of a single broadcast television channel. Alternatively, a program might consist of a combination of television channels to be used in conjunction with each other, such as channels having multiple viewpoints at a sporting event. As another example, a program might comprise a TV channel in conjunction with one or more specified sub-channels.

In addition to television channels, available programs include executable applications comprising program code to be received and executed at the STB itself. Such applications are used for accessing interactive services or for performing any other functions the STB might be capable of. In the described embodiment, the executable applications include interactive applications which present information to the viewer on TV 14 and which prompt a the viewer for information or instructions. A movies-on-demand application is an example of such an interactive application which executes at the STB. A movies-on-demand application prompts a viewer to select a movie from a plurality of available movies, requests the selected movie from the headend, and then receives and displays the selected movie. The movies themselves might also be considered programs under the definition used herein.

Figure 2:
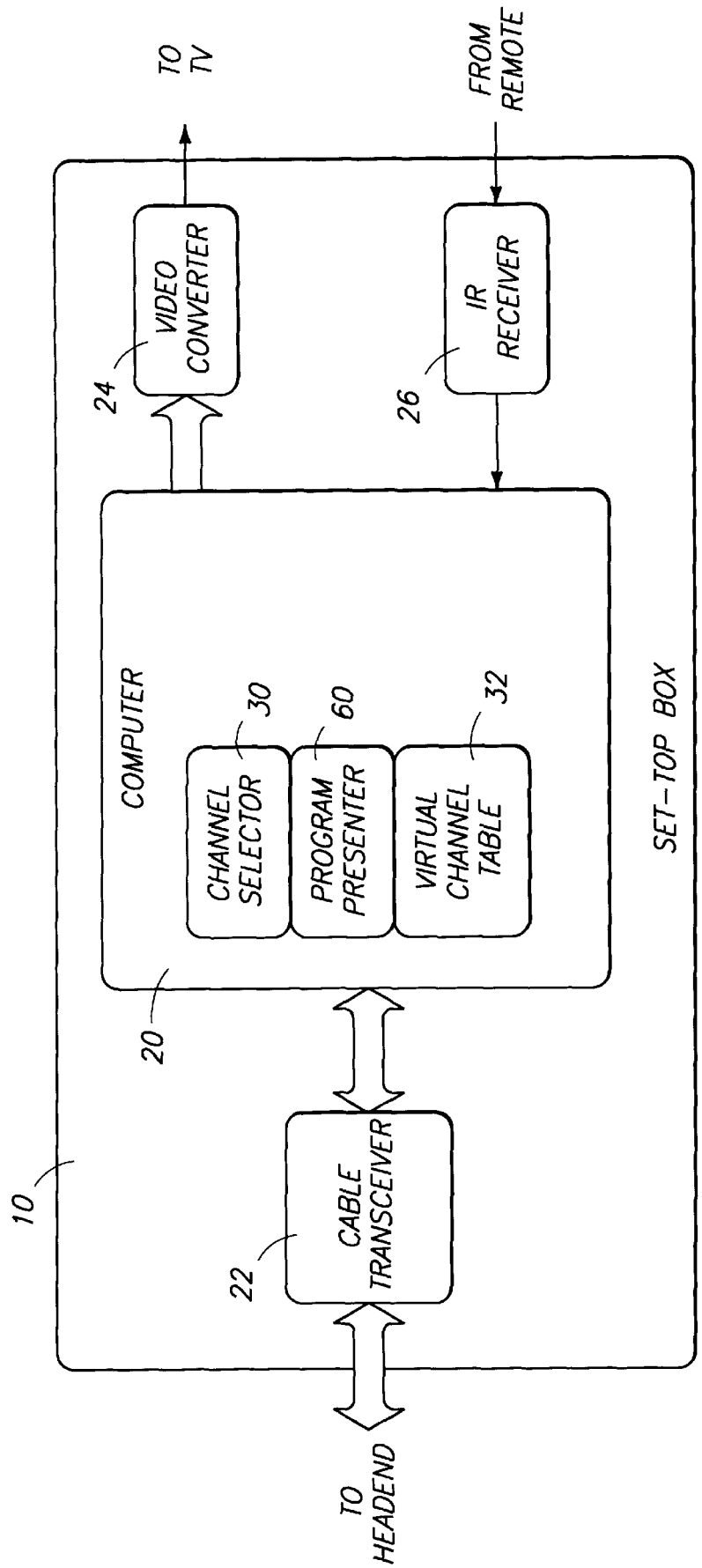
FIG. 2 is a block diagram of a subscriber interface unit in accordance with a preferred embodiment of the invention.

FIG. 2 shows the general configuration of a subscriber interface unit or set-top box (STB) 10 in accordance with the invention. STB 10 comprises a computer or data processor 20, such as any one of a number of available microprocessors, in conjunction with common peripheral components such as electronic memory and I/O components. STB 10 also includes means for receiving at least one of a plurality of the programs available from headend 12. Such means is preferably formed by a bi-directional communications port such as the cable or network transceiver 22 shown. Communications with the headend might occur under a variety of protocols including network protocols such as asynchronous transfer mode (ATM) and internet protocol (IP). In some cable distribution systems, it might be possible to receive a combination of analog and digital signals through cable transceiver 22.

STB 10 furthermore includes a video port or converter 24 for connection to TV 14 to display graphics on TV 14, and a viewer input port 26 such as an infra-red (IR) receiver which accepts commands from a human viewer through the use of portable remote control device 16.

Instead of being integrated in a stand-alone box, the components of STB 10 could be integrated into a television receiver or other audio/visual device.

STB 10 includes a channel selector or channel selector module 30 which executes on computer 20 within STB 10. Channel selector 30 in the described embodiment is simply a resident program module which maintains a current virtual channel number and which allows a viewer to designate or change the virtual channel number through use of remote keypad 16 and IR receiver 26. For instance, a viewer can designate a virtual channel number by pressing numeric keys on remote control keypad 16. Alternatively, a viewer can increment or decrement the virtual channel number by pressing up or down control keys on keypad 16. The resulting selection is displayed on television receiver 14. Preferably, there is a slight delay after moving to a particular number before that number becomes the current virtual channel number. The channel selector function could also be performed by a mechanical or electromechanical device such as a rotary switch.

STB 10 includes means for associating each virtual channel number with a program from headend 12. In the described embodiment, such means comprises a virtual channel table 32 having entries for a plurality of virtual channel numbers. An entry for a particular virtual channel number includes a designation of an available program from the headend which is to be associated with the virtual channel number.

Figure 3:
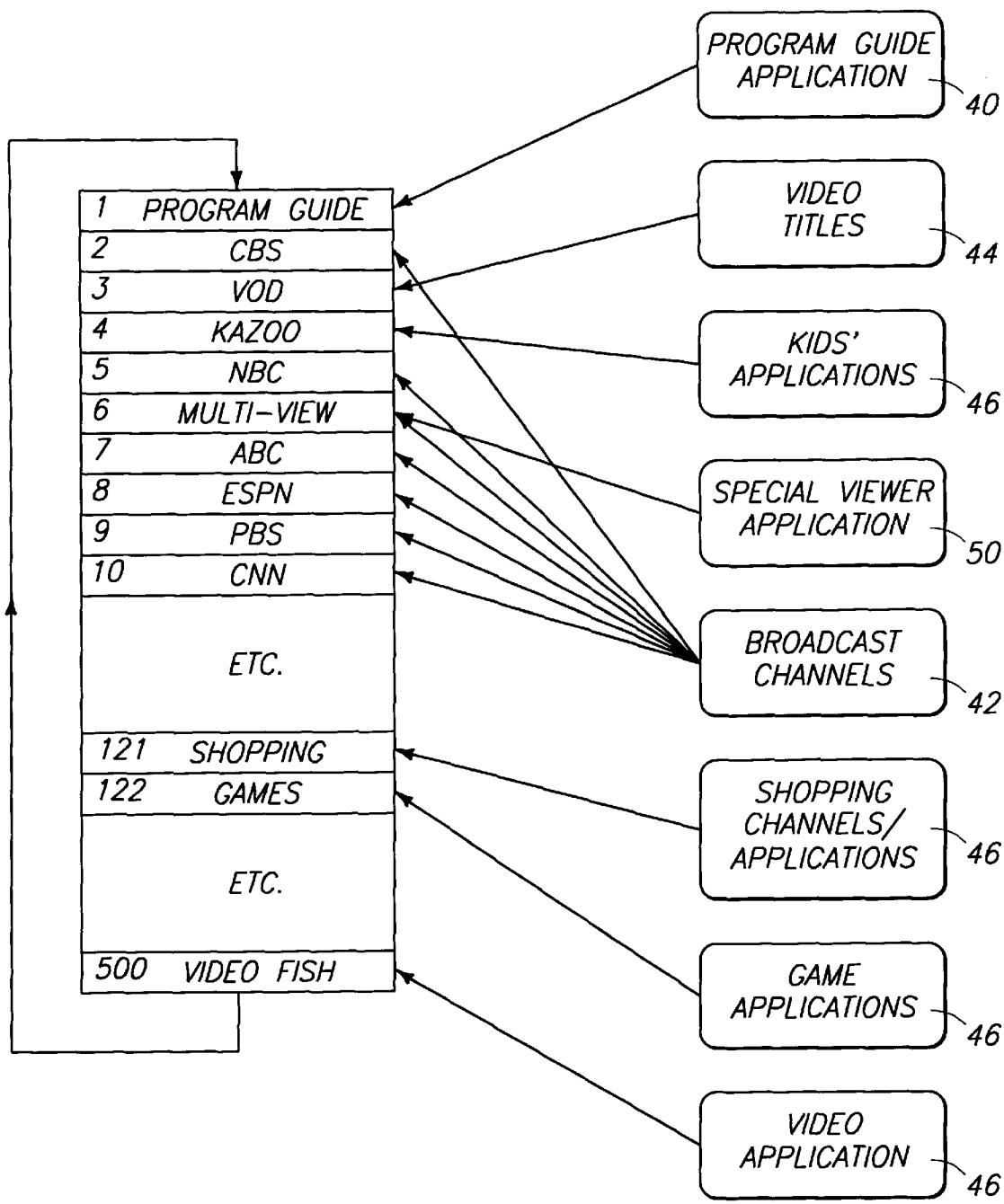
FIG. 3 is a block diagram showing exemplary service to virtual channel mappings in accordance with the invention.

FIG. 3 is a diagrammatic illustration of virtual channel table 32. In the example given, table 32 contains 500 entries, for virtual channel numbers 1 through 500. The channels are arranged in order. A viewer can increment or decrement the virtual channel number to move or "surf" between channels. When incrementing above the last virtual channel number, the first entry becomes current. When decrementing below the first virtual channel number, the last entry becomes current.

Each entry designates a specific program available from the headend. The programs are illustrated in the blocks at the right of the diagram. As illustrated, virtual channel number 1 is associated with an electronic program guide application 40. This is an executable application which, when selected, is to be downloaded and executed at the STB. Virtual channel 2 is associated with a specific television broadcast channel. The available broadcast channels are represented by block 42. Channels 5, 7, 8, 9, and 10 are also associated with broadcast channels. Any one of these might also be associated with a particular channel/sub-channel combination. Virtual channel 3 is associated with a video or movies-on-demand application which allows a viewer to select from a plurality of available movie titles 44. Virtual channels 4, 121, 122, and 500 are associated with other illustrated examples of executable applications 46 which, when selected, are to be executed at STB 10. Virtual channel 6 is associated with a combination of broadcast TV channels and with an application 50 for coordinating the viewing of such channels. For instance, the channel might be associated with broadcast channels having multiple views of a sporting event, while application 50 is a user interface which runs on the STB for allowing a viewer to easily change between the different views. The particular assignment of applications and broadcast channels to virtual channels is completely unrestricted. Broadcast channels can be alternated with applications in any order or distribution.

STB 10 further comprises a program presenter or program presenter module 60 which presents on the video display device the program associated with the current virtual channel number. Program presenter 60 is preferably an application program which runs on computer 20 of STB 10. When a virtual channel number is selected by a user, computer 20 is programmed through program presenter 60 to request the program associated with the current virtual channel number from headend 12, and to subsequently present the requested program on TV 14 through video port 24. If the requested program is an executable application, the program presenter module downloads and initiates execution of the program. Special provisions might be made for allowing immediate gratification during "channel surfing" (rapid scrolling through virtual channel numbers). For instance, applications might have program "stubs" or "mini-applications" which load and execute very quickly to indicate the general nature of the particular chosen virtual channel while the main application is loading.

Figure 4:
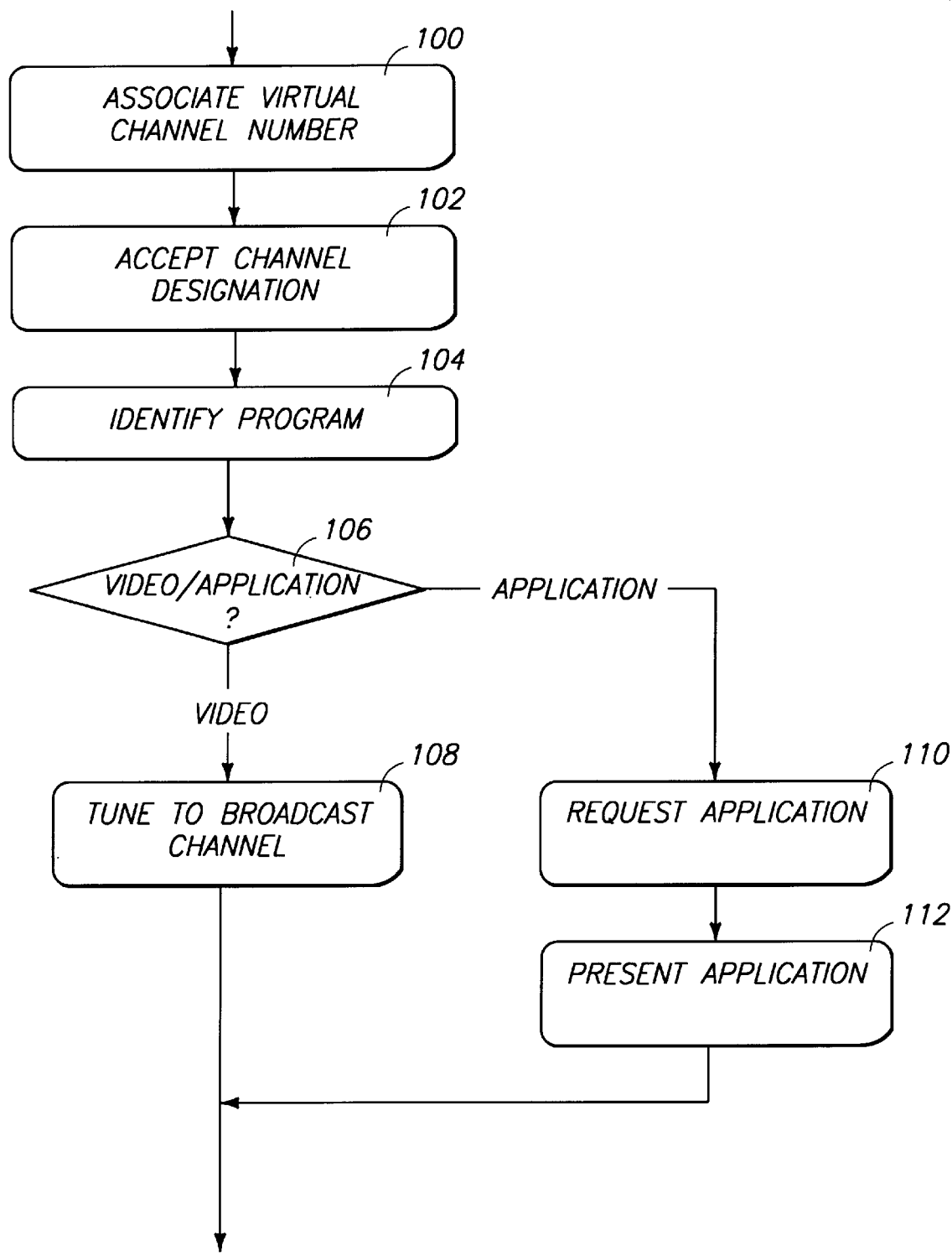
FIG. 4 is a flow chart showing preferred methodical aspects of the invention.

FIG. 4 shows exemplary methodical steps implemented by STB 10. A step 100 represents associating a virtual channel number with a program from headend 12. This step, as already discussed, includes maintaining virtual channel table 32 in response to viewer commands, and entering a designation of an available program in the table to be associated with each virtual channel number. In the exemplary embodiment of the invention described herein, the viewer is involved in setting up and maintaining a channel line-up in the virtual channel table—the viewer can change the mapping of virtual channel numbers to available programs.

Step 102 comprises accepting commands from a viewer to designate a current virtual channel number from a plurality of virtual channels numbers. This step is preferably accomplished through remote keypad 16 and IR receiver 26. A step 104 comprises determining which program from the remote headend is associated with the current virtual channel number designated by the viewer. This involves referencing the virtual channel table. As discussed above, the program might be an application or a broadcast video channel. A step 106 comprises determining whether the program is an application or broadcast video. If the program is an application, a step 110 is performed of requesting or downloading the application from the headend. The application is then executed in step 112, and presented on an audio/visual display device associated with the STB. If the program is a broadcast channel, a step 108 is performed of tuning to the broadcast channel and displaying the channel on the audio/visual display device.

The invention allows a consistent and simple user-interface to available services of any type. Rather than having to learn different menu structures for each type of service, a user can select services using the model already used by conventional broadcast TV. In addition, the use of virtual channels allows a user to reconfigure an STB for any arbitrary mapping of services to channel numbers, and to associate multiple types of services with single virtual channels.

In compliance with the statute, the invention has been described in language more or less specific as to structural and methodical features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents.

We claim:

1. A user interface for use in conjunction with a video display device and with a service provider having a plurality of available programs, the available programs including broadcast television channels and executable applications to be received and executed at the user interface, the subscriber interface unit comprising;

a data processor;

a communications port for bi-directional communications with the service provider;

a video port for connection to the video display device;

memory that is accessible by the data processor;

a channel table in the memory, the channel table having entries for a plurality of channel numbers, the entries mapping the available programs to respective ones of the channel numbers, wherein at least one of the entries maps an executable application to a channel number;

a channel selector module which executes on the data processor, the channel selector module accepting channel number selections from a human viewer;

in response to the channel selector module accepting a selection of a particular channel number, the data processor performing steps comprising:

referencing the channel table to determine which of the available programs is mapped to the particular channel number;

if the program mapped to the particular channel number is an executable application, downloading the executable application through the communications port and executing it on the data processor to generate content on the video display device through the video port.

2. A user interface as recited in claim 1 and further comprising an interactive application which is one of the executable applications available from the service provider, wherein the interactive application presents information to the viewer on the video display device and accepts commands from the viewer.

3. A user interface as recited in claim 1 and further comprising a movies-on-demand application which is one of the executable applications available from the service provider, wherein the movies-on-demand application prompts a viewer through the video display device to select a movie from a plurality of available movies and which then receives and displays the selected movie on the video display device.

4. A method of selecting programs in an interactive network comprising a plurality of user interfaces connected to receive programs from a service provider, the method comprising the following steps:

accepting channel mapping designations from a human viewer;

in response to the channel mapping designations accepted from the viewer, creating a mapping of programs from the service provider to respective channel numbers;

accepting a selection of a current channel number from the viewer;

referencing the mapping of programs to channel numbers to determine which program from the service provider is mapped to the current channel number selected by the viewer;

receiving the program associated with the current channel number from the service provider;

presenting the requested program on a video display device associated with the user interface.

5. A method as recited in claim 4 and further comprising:

including broadcast television channels in the programs from the service provider;

the creating step comprising mapping a combination of broadcast television channels with a particular channel number.

6. A method as recited in claim 4 and further comprising:

including broadcast television channels in the programs from the service provider, said broadcast channels having one or more sub-channels;

the creating step comprising mapping one of the broadcast television channels and at least one of its sub-channels to a particular channel number.

7. A method as recited in claim 4 and further comprising the following additional steps:

including a movies-on-demand application in the programs from the service provider;

when the program mapped to the current channel number is the movies-on-demand application, receiving and executing the movies-on-demand application;

the movies-on-demand application prompting the viewer to select a movie from a plurality of available movies and then receiving and displaying the selected movie.

8. A method of selecting programs in an interactive network comprising a plurality of user interfaces connected to receive programs from a service provider, the method comprising the following steps:

maintaining a channel table having entries for a plurality of channel numbers, the entries mapping the programs from the service provider to respective ones of the channel numbers;

accepting channel mapping designations from a human viewer;

entering the channel mapping designations in the channel table;

accepting a selection of a current channel number from the viewer;

referencing the channel table to determine the program mapped to the current channel number;

receiving the program associated with the current channel number from the service provider;

presenting the received program on a video display device associated with the user interface.

9. A method as recited in claim 8 and further comprising:

including broadcast television channels in the programs from the service provider;

wherein the channel mapping designations map a combination of broadcast television channels to a particular channel number.

10. A method as recited in claim 8 and further comprising:

including broadcast television channels in the programs from the service provider, said broadcast channels having one or more sub-channels;

wherein the channel mapping designations map one of the broadcast television channels and at least one of its sub-channels to a particular channel number.

11. A method as recited in claim 8 and further comprising the following additional steps:

including both broadcast television channels and executable applications in the programs from the service provider;

when the current channel number is mapped to an executable application in the channel table, executing the executable application at a user interface.

12. A method as recited in claim 8 and further comprising the following additional steps:

including a movies-on-demand application in the programs from the service provider;

when the current channel number is mapped to the movies-on-demand application in the channel table, executing the movies-on-demand application at a user interface;

the movies-on-demand application prompting the viewer to select a movie from a plurality of available movies and then receiving and displaying the selected movie.

13. A user interface for use in conjunction with a video display device and with a service provider having a plurality of available programs, the user interface comprising;

means for accepting channel mapping designations from a human viewer, each channel mapping designation mapping one or more of the available programs to a particular channel number a channel selector that accepts a selection of a current channel number from the viewer and that determines the program mapped to the current channel number in accordance with the channel mapping designations accepted from the viewer;

communications means for receiving the program mapped to the current channel number from the service provider;

a program presenter which presents the program mapped to the current channel number.

14. A user interface as recited in claim 13 wherein:

the plurality of programs available from the service provider includes individual broadcast television channels having one or more sub-channels; and at least one of the channel mapping designations maps one of the broadcast television channels and at least one of its sub-channels to a particular channel number.

15. A user interface as recited in claim 13 wherein:

the plurality of programs available from the service provider further includes movies which can be selected by a viewer for viewing on demand;

one of the downloadable applications is a movies-on-demand application which executes at the user interface, and wherein the movies-on-demand application prompts the viewer through the video display device to select a movie from a plurality of available movies and then receives and displays the selected movie on the video display device.

16. A user interface for use in conjunction with a service provider having a plurality of available downloadable applications, the user interface comprising;

means for accepting channel mapping designations from a human viewer, at least one of the channel mapping designations mapping one or more of the available downloadable applications to a particular channel number;

a channel selector that accepts a selection of a current channel number from the viewer and that identifies any downloadable application mapped to the current channel number in accordance with the channel mapping designations accepted from the viewer;

communications means for downloading the downloadable application mapped to the current channel number from the service provider;

a program presenter which executes downloaded application.

17. A user interface as recited in claim 16 wherein:

the service provider also has movies which can be selected by a viewer for viewing on demand;

one of the downloadable applications is a movies-on-demand application which executes at the user interface, and wherein the movies-on-demand application prompts the viewer to select a movie from a plurality of available movies and then receives and displays the selected movie.

18. A method as recited in claim 4, and further comprising the following additional steps:

including both broadcast television channels and executable applications in the programs from the service provider;

wherein the channel mapping designations map an executable application to a particular channel number;

executing the executable application at a subscriber interface unit when the executable application is mapped to the current channel number.

* * * * *